United States Patent [19]
Murray et al.

[11] Patent Number: 5,338,497
[45] Date of Patent: Aug. 16, 1994

[54] INDUCTION HEATING METHOD FOR FORMING COMPOSITE ARTICLES

[75] Inventors: Allan D. Murray, Dearborn; Michael D. Tisack, Ann Arbor; Yitah R. Wu, Inkster, all of Mich.

[73] Assignee: Ford Motor Company, Dearborn, Mich.

[21] Appl. No.: 862,946

[22] Filed: Apr. 3, 1992

[51] Int. Cl.⁵ ............................................. B29C 35/02
[52] U.S. Cl. ...................................... 264/25; 264/257
[58] Field of Search .............. 264/25, 26, 257, 328.2, 264/DIG. 46; 219/10.41

[56] References Cited

U.S. PATENT DOCUMENTS

| | | | |
|---|---|---|---|
| 2,533,439 | 12/1950 | Elder | 139/291 R |
| 3,427,185 | 2/1969 | Cheatham et al. | 264/257 |
| 3,461,014 | 8/1969 | James | 156/272.4 |
| 3,936,412 | 2/1976 | Rocholl | 264/26 |
| 3,960,629 | 6/1976 | Goldsworthy | 156/272.4 |
| 4,037,009 | 7/1977 | Severinsen | 428/253 |
| 4,191,718 | 3/1980 | Mallick et al. | 264/26 |
| 4,403,653 | 9/1983 | Davidson | 428/379 |
| 4,423,191 | 12/1983 | Haven et al. | 264/26 |
| 4,555,373 | 11/1985 | Bloemkok et al. | 264/26 |
| 4,575,432 | 3/1986 | Lin et al. | 524/440 |
| 4,581,158 | 4/1986 | Lin | 252/511 |
| 4,613,473 | 9/1986 | Layden et al. | 264/258 |
| 4,626,642 | 12/1986 | Wang et al. | 264/26 |
| 4,647,495 | 3/1987 | Kanayama et al. | 428/246 |
| 4,681,712 | 7/1987 | Sakakibara et al. | 264/24 |
| 4,749,833 | 6/1988 | Novorsky et al. | 219/10.53 |
| 4,762,864 | 8/1988 | Goel et al. | 523/428 |
| 4,764,409 | 8/1988 | Freeman | 428/98 |
| 4,767,799 | 8/1988 | Thorsrud | 264/26 |
| 4,772,438 | 9/1988 | Watanabe et al. | 264/25 |
| 4,840,758 | 6/1989 | Thorsrud | 264/257 |
| 4,863,789 | 9/1989 | Arai | 428/253 |
| 4,871,412 | 10/1989 | Felix et al. | 156/304.3 |
| 4,880,679 | 11/1989 | Bonazza | 156/304.3 |
| 4,948,661 | 8/1990 | Smith et al. | 264/257 |
| 5,049,323 | 9/1991 | Giles, Jr. | 264/257 |
| 5,073,315 | 12/1991 | Bertelson | 264/257 |
| 5,139,407 | 8/1992 | Kim et al. | 264/26 |
| 5,182,134 | 1/1993 | Sato | 156/273.3 |

OTHER PUBLICATIONS

"Resin Transfer Molding for Advanced Composites", *Advanced Composites* Mar./Apr. 1990, pp. 61–80.

*Primary Examiner*—Jay H. Woo
*Assistant Examiner*—Robert B. Davis
*Attorney, Agent, or Firm*—Damian Porcari; Roger L. May

[57] ABSTRACT

An induction heating method includes the steps of molding composite material having non-induction heatable reinforcement material and induction heatable material in a thermally curable polymer based resin, followed by curing the polymer based resin at least partially while in the mold by exposure to a time varying magnetic field. The molding tool apparatus has molding tool members defining a molding tool cavity corresponding to the desired composite article, and an induction heating system having induction coils integral with the molding tool members such that the molding tool cavity is disposed between them. An electrical circuit for providing power to the induction coils to generate a time varying magnetic field about the molding tool cavity includes an RF generator and a matching network for matching the impedance of the induction coils, electrical leads and connections of the induction heating system to the output of the RF generator.

27 Claims, 1 Drawing Sheet

INDUCTION HEATING METHOD FOR FORMING COMPOSITE ARTICLES

INTRODUCTION

The present invention is directed toward improved methods of manufacturing composite articles. More particularly, the invention provides methods of manufacturing composite articles employing inductance heating to at least partially cure a preform of the article.

BACKGROUND OF THE INVENTION

Composite articles are well known to provide advantages in diverse applications including, for example, body panels and other components for motor vehicles. In some applications the advantages of composite articles over metal, ceramic or other materials include weight reduction and the ability to integrate several otherwise individual parts into a single structure. Composite articles of this nature comprise reinforcement material in a polymer based resin, such as a thermoplastic or a thermoset plastic, which is moldable in a first condition but curable (for example, by cooling below the softening point in the case of a thermoplastic) to a form-stable condition. Numerous reinforcement materials are well known to those skilled in the art including, for example, chopped or continuous fibers disposed either randomly or in ordered fashion within the matrix. Exemplary composite materials include sheet molding compound (SMC), typically comprising chopped glass fibers in a thermoset resin, and bulk molding compound (BMC), typically comprising a granulated or putty-like mixture of chopped fibers in a polymer based resin.

A significant disadvantage frequently inherent in the manufacture of composite articles resides in the relatively long cycle times required especially for composite articles having large cross-sectional areas, such as thick wall sections and the like. The cycle time for such components, that is, the time required for loading composite material into a mold, plus the time required for molding and curing the resin of the composite article at least sufficiently to remove it from the mold can jeopardize the economic feasibility of the operation in some cases. Thick cross-sectional areas, such as thick wall sections and the like, as frequently occur in structural or semi-structural components or components having complex configurations, require relatively longer curing time than do thin cross-sectional components. In a typical case of a composite article comprising a thermoset resin, sufficient heat must be provided to the article to cure both the thick and thin cross-sectional areas. While the thinner areas may cure quickly, the cycle time is increased by the longer curing time required by the thicker sections. Longer cycle times may directly reduce the efficiency of the manufacturing process and increase the piece price of the component. It has long been a recognized need in the industry to reduce cycle times in the manufacture of composite articles. Even where lengthy cycle time is not a serious problem, there often is a need to better control the uniformity of resin cure or to deliberately accelerate curing in selected portions of the composite article. As disclosed and discussed below, various embodiments of the invention are addressed to one or more of these recognized needs and other advantages of the invention will be apparent to those skilled in the art of composite article manufacturing.

SUMMARY OF THE INVENTION

In accordance with the present invention a method or process of forming a composite article comprises molding composite material in a mold, perhaps starting as a preform of the article to be formed. The composite material comprises non-induction heatable reinforcement material together with induction heatable material in a polymer based resin. The composite material is cured at least partially by induction heating. More specifically, the molded composite material is exposed to a time varying magnetic field, and heat thereby generated in the induction heatable material is conducted to the surrounding resin. The induction heating may be used to completely cure the article or only partially cure it, for example, sufficiently to enable the article to be passed to any subsequent processing steps. Additional heating may be used in conjunction with the induction heating. Thermal heating, for example, may be provided through the walls of the mold during the curing step. It should be understood that various preferred embodiments of the invention involve additional features or steps discussed in detail below.

It will be recognized by those skilled in the art of manufacturing composite articles that the present invention presents a significant advance in the art. Depending upon the particular application to which the invention is applied, one or more significant advantages may be achieved. Thus, for example, faster (that is, shorter) cycle times may be achieved by the substitution or addition of induction heating to a process otherwise employing only thermal heating.

Various features and advantages of the invention are specific to particular embodiments, such as the preferred embodiments described in detail below. Those skilled in the art of composite article manufacture, aided by this disclosure of the invention, will readily understand that certain such features and advantages are specific to the particular application of the invention. Certainly, many preferred embodiments of the invention will provide the very significant advantage of faster cycle times. In those cases, use of the induction heating method of the invention will promote greater production efficiency through reduction in the time required to cure the preform. Numerous other preferred applications of the invention will provide the alternative or additional advantage (depending on the application) of more uniform resin cure. Thus, for example, as discussed further below, the invention is especially advantageous in the manufacture of composite articles of non-uniform cross-sectional dimension. Thicker wall sections and other large cross-sectional dimension portions of such a non-uniform thickness preform can be cured more uniformly or in a controlled non-uniform progression.

Another advantage of certain preferred applications of the invention resides in the induction heatable material incorporated into the preform. The presence of electrically conductive induction heatable material in the finished composite article will provide EMI shielding. That is, in addition to its role in promoting resin cure during manufacture of the composite article, it could provide EMI shielding useful in the composite article's intended function.

Other potential advantages inherent in at least certain preferred applications of the invention involve the presence of the induction heatable material in a preform of the composite article. In certain applications wherein the preform is handled during manufacture of the composite article, the induction heatable material may strengthen the preform or make it more durable for handling. In a resin transfer molding (RTM) application of the invention, for example, long metal fibers interwoven with glass or other non-induction heatable reinforcement material on the surface of a preform core may aid in interconnecting the reinforcement material and in fixing the orientation and position of the reinforcement material on the preform core. In certain cases it will be possible to employ less binder resin in the preform and fiber wash during resin injection into the RTM molding cavity may be reduced. It will also be apparent how the induction heatable material in such applications will render a preform more durable for handling automation.

Molding apparatus for making the composite articles described above is provided according to another aspect of the invention. The molding apparatus of the invention comprises two or more mold members and an induction heating system. The induction heating system includes induction coils integral with the mold members. An RF generator actuates the induction coils through a matching network to product a time varying magnetic field across the molding cavity. The molding apparatus of the invention can provide advantages over conventional equipment.

Conventional molding die equipment typically incorporates heating and cooling fluid circulating lines within the dies. It is often desirable to inject resin into a cooled mold, so that the resin better wets the surface of the die and preform. Once the die surface and preform have been wetted, the die is then heated to accelerate curing. The cooling lines within the molding die and the ancillary circulation equipment, fluids, valving, etc. introduce cost and complexity into the molding process. In addition, the dies themselves typically have a large thermal mass which requires time to heat and cool, adding to the cycle time. In applications of the present invention substituting induction heating for such conventional heating methods, the cost and complexity of circulating fluids is avoided and, in addition, the induction heating can often be focused primarily in the thicker areas of the curing preform resulting in lower cycle time.

It will also be appreciated from the foregoing that finished composite articles may in certain applications of the invention be tougher or more durable by reason of the induction heatable material incorporated therein. In particular, the induction heatable material may in certain applications contribute to improved impact resistance in the composite article and to a reduction in the brittle failure mode which otherwise is sometimes associated with composite articles. Additional features and advantages of various applications of the invention will be apparent also to those skilled in the art of composite article manufacture from the following more detailed description of certain preferred embodiments of the invention.

BRIEF DESCRIPTION OF THE DRAWINGS

The induction heating method of the invention will be described below in connection with the accompanying drawings in which.

DETAILED DESCRIPTION OF PREFERRED EMBODIMENTS

Figure 1:
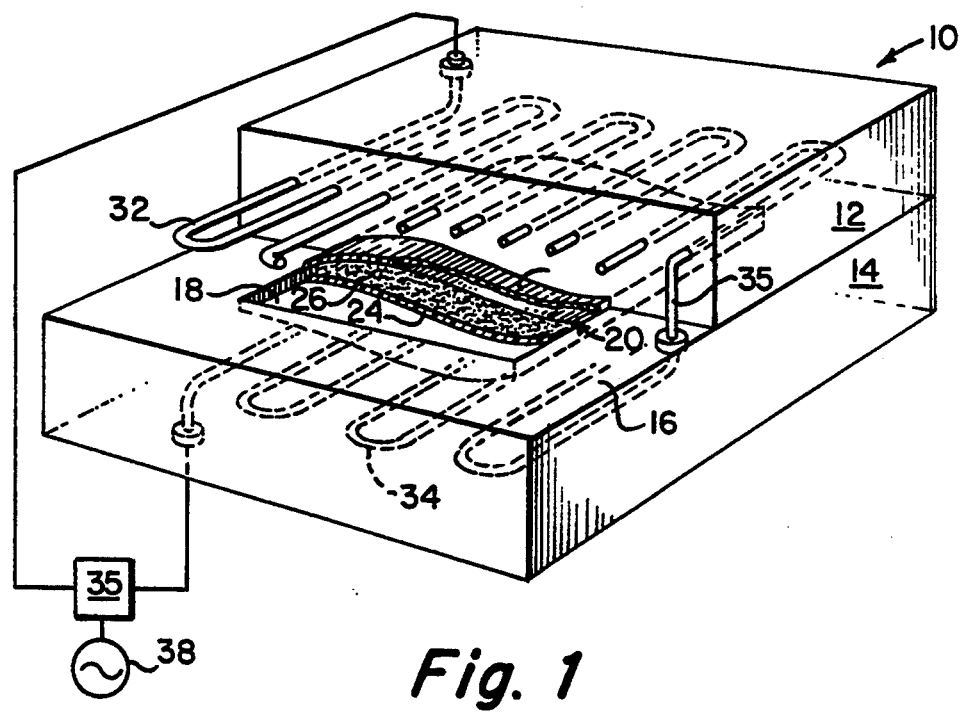
FIG. 1 is a diagrammatic, partially cross-sectional view of a matched die molding tool in accordance with the invention, being equipped for SMC compression molding and induction curing of molded composite articles.

The induction curing method of the present invention is applicable to the manufacture of composite articles in a wide variety of molding techniques well known to those skilled in the art. It should be understood as a preliminary matter that the term "composite article" as used herein refers to a reinforced plastic article, that is, to a article molded of polymer based resin with reinforcement material distributed within the resin. The invention is applicable to both high pressure and low pressure molding techniques. Low pressure molding techniques in which the invention is applicable include, for example, hand layup, sprayup, continuous laminating, centrifugal casting, encapsulation, plus pultrusion and filament winding. High pressure molding techniques in which the inductive curing of the invention is applicable include, for example, compression molding techniques such as bulk molding compound and sheet molding compound techniques, and injection molding techniques such as resin transfer molding. Numerous resins are commercially available and well known to those in the composite article manufacturing field for use in the particular molding technique selected. Both thermoplastics and thermoset plastics can be used depending on the particular type of composite article being manufactured.

Numerous different reinforcement materials are commercially available and well known for use in composite articles. Most often the reinforcement material employed in composite articles is non-inductively heatable, that is, it does not become substantially heated when exposed to a time varying magnetic field. Reinforcement materials of this type include filamentary glass, which is the most common, synthetic fibers, such as aramid fibers and the like, etc. Such reinforcement material can be provided, depending on the application, in any of numerous different forms. Thus, for example, in hand layup or contact molding techniques chopped strand, mat, fabric and woven roving are frequently used; in sprayup techniques chopped roving is most often used; in resin transfer molding (RTM) needled mat, chopped strand mat, continuous strand mat, and the like can be fixed to the surface of a preform core; in centrifugal casting needled mat, chopped strand mat and chopped rovings are frequently used; in the various matched die molding techniques mat, fabric, chopped strand and the like are often used; in both bulk molding compound (BMC) techniques and sheet molding compound (SMC) techniques the reinforcement material most frequently is roving, yarn, chopped strand and the like; in pultrusion methods the reinforcement material is most often in the form of roving, needled mat, chopped strand mat, fabric and woven roving; in injection molding techniques, including reaction injection molding techniques (e.g. reinforced reaction injection molding (RRIM) and structural reaction injection molding (SRIM) etc.) chopped strand typically is preincorporated into the polymer based resin injected into the molding cavity; filament winding techniques typically employ roving, yarn or tape to create a preform on a mandrel for subsequent curing, generally within a molding form. It is within the ability of those skilled in the composite article manufacturing field to select appropriate reinforcement material for use in application of the present invention, based on the forming technique, the composite article being made, and other such considerations.

In addition to the non-induction heatable reinforcement material of the composite article, the method of the present invention employs induction heatable material in the composite article. Numerous suitable induction heatable materials are commercially available and will be readily apparent to those skilled in the art in view of the present disclosure. Generally such materials are electrically conductive, for example, metal, conductive polymer, carbon (e.g., graphite) and the like. The induction heatable material can be in any form which can be adequately distributed within the composite article, including, for example, continuous fiber, chopped fiber, particulate and powder forms.

Electrically conductive fibers suitable for use in the invention can be selected from a wide variety of materials. Generally speaking, the induction heatable material will preferably be formed of metal whiskers or fibers in the form of a network, for example, in the form of a fabric, screen or mat. Induction heatable material also may be included in the form of knitted small-gauge wire. Various conductive metals suitable for the invention include, for example, aluminum, copper, silver, gold, nickel, tin, lead and alloys of any of them, provided that the polymer based resin selected for the composite article does not undesirably interact with the metal, such as by corrosion. One preferred material is electrically conductive fibers in the form of metalized carbon fibers, such as nickel coated carbon fibers, which are commercially available.

The manner in which the induction heatable material is incorporated into the preform will depend upon the form of induction heatable material selected, the particular molding process to be employed for the manufacture of the composite article and the configuration and nature of the composite article itself. As discussed further below, the induction heatable material need not be homogeneously or uniformly distributed but, rather, may be concentrated in selected portions or zones of the composite article or its preform to achieve selective or accelerated curing in those portions. Particulate or powderous induction heatable material may be provided by admixture with the polymer based resin, for example. If provided in the form of continuous fiber or ribbon, it can be interwoven with non-induction heatable reinforcement material fibers. In selected applications this will have the added benefit of contributing strength to the preform and the finished composite article. Numerous alternative configurations of induction heatable material and numerous additional techniques for incorporating the same into the composite article preform will be apparent to those skilled in the art in view of the present disclosure.

The induction heating of the present invention should not be confused with other forms of heating, for example, dielectric heating. There are several very significant differences between the two. In induction heating a coil is employed to couple a load; induction heaters typically couple maximum current to the load. The generation of heat by induction operates through the rising and falling of a magnetic field around a conductor with each reverse of an alternating current source. Dielectric heating involves heating of a normally electrically insulating material due to its own electrical (dielectric) losses, when the material is placed in a varying electrostatic field. The present invention does not rely on the heating of normally electrically insulating materials. Rather, the induction heating employed in the present invention involves increasing the temperature of a polymer based resin in a composite article by generating heat in induction heatable material incorporated into the article. While not intending to be bound by theory, induction heating is understood generally to involve an induced electric current, also known as an eddy-current, produced in a conductor by a time varying magnetic field. Thus, the metal fiber, graphite or other induction heatable material in composite articles of the invention are heated by exposure to a time-varying magnetic field and this, in turn, heats the polymer based resin of the preform to effect curing.

It should be understood that the term "concentrated" as used herein with reference to distribution of the induction heatable material within the composite article or the preform for the composite article means a greater density in the induction heatable material measured usually by the amount of heat generated in response to exposure to a given time varying magnetic field. A given preform may have induction heatable material more concentrated in a first portion or zone than a second in that the second zone either has a lower density induction heatable material or none at all. It will be recognized in view of the present disclosure that the amount of heat actually generated during the curing step in a given portion or zone will depend, in addition to the concentration of induction heatable material, on other factors such as, for example, the distance from the induction coils, the presence of insulating materials, orientation of the preform between the induction coils and the like. Various advantages of the invention, such as the just described ability to focus and control heating in selected portions of the composite article during curing, are especially significant in the manufacture of complex shapes, meaning primarily non-monoplanar configurations. It should be understood also that the terms cure, curing and the like, as used herein, mean the setting of a polymer based thermoset resin or, in the case of a thermoplastic, cooling of the resin (or allowing it to cool) to below its softening point after or during molding of the composite article.

It will be readily apparent to those skilled in the art that the term "preform" is used quite broadly in describing and defining various applications and embodiments of the present invention. Depending upon the particular molding process being used and the particular composite article being formed, the preform may not take on the shape of the final composite article until after curing has already commenced. In fact, curing may commence simultaneously with or even prior to the shaping operation. The term preform is intended to include all such variations and requires only that there be a free-surfaced body (i.e., a body whose surface is to be acted upon during the molding process and is not permanently adhesively bonded to the molding tool surface) comprising both induction heatable material and non-induction heatable reinforcement material combined with an at least partially uncured polymer based resin. Typically the configuration of the preform is a complex configuration approaching that of the intended composite article. The resin may entirely envelope the induction heatable and reinforcement materials or may be provided simply as an impregnation or coating thereon, perhaps sufficient to act as a binder during the curing step. Especially in the latter case the resin may be a thermoplastic resin which is heated during cure only sufficiently to soften and bond the resin coating on adjacent filaments, wire strands, etc., thereafter being allowed to cool to fix the product in the interconnected condition.

One preferred embodiment of the invention provides a structural reaction injection molding (SRIM) process in which reactive resin components are injected into a mold cavity holding a foam or fibrous reinforcement body or the like.

In accordance with the present invention, the resin may comprise induction heatable material, e.g. metal powder, or the foam or fiber reinforcement could comprise induction heatable material to accelerate curing of the resin by induction heating. Suitable polymer based resin compositions for use in reaction injection molding are readily commercially available and well known to those skilled in the art.

Referring now to FIG. 1, a structural reaction injection molding tool is illustrated diagrammatically, partially in cross-section. The SRIM forming tool 10 is seen to comprise upper and lower tool halves, specifically, a ceramic upper molding die 12 and a ceramic lower molding die 14. Cast ceramic materials, that is, chemically bonded ceramic materials, are preferred for cost reasons, although sintered ceramic also would be operable. It is well within the ability of those skilled in the molding tool art to select suitable ceramic or other material for the mold members. Other suitable mold materials include phenolics and other non-metallics. It should also be recognized that the induction coils could be mounted outside the mold members, and this may be preferred in certain applications for ease of maintenance and the like. The tool halves separate at parting line 16 to expose molding cavity 18. Cavity 18 is seen to hold a composite article preform 20 (not shown in cross section) comprising reactive polymer based resin 22, metallic strands 24 and filamentary glass reinforcement material 26. The metallic strands 24 are electrically conductive and serve as the induction heatable material in the preform. The filamentary glass reinforcement material 26 is in chopped form, as are the metallic strands 24. Both are distributed randomly and substantially uniformly within the preform. Generally, it will be desirable to inject the reactive polymer based resin into a cooled die, so that the resin better wets the surface of the die and the preform.

In accordance with the present invention, an induction curing system 30 is provided comprising an upper induction coil 32 embedded within ceramic upper die 12. A lower induction coil 34 is similarly embedded within lower ceramic die 14. Preferably, lower induction coil 34 lies in a plane substantially parallel to that of upper induction coil 32, with the molding cavity (and hence the preform to be cured) disposed between the coils. The induction coils are electrically connected to one another via electrical connection means 35 when the mold is closed. Matching network 36 of the induction curing system 30 comprises circuitry well known to the skilled of the art for matching the impedance of the coils and associated leads and connections to the output of RF generator 38. Typically, the RF generator is tuned to a specific frequency and the impedance of the induction curing system 30 is matched to this specific frequency by matching network 36. Actuation of the induction curing system (30) generates a time-varying magnetic field acting upon the preform 20 within molding cavity 18. The resultant heating of the metallic strands of the preform, and therefore of the resin of the preform, accelerates curing and shortens the cycle time for production of the composite article. It will be within the ability of those skilled in the art, in view of the present disclosure, to select suitable components for the induction heating system 30, all of which are readily commercially available.

Another preferred embodiment of the invention provides a sheet molding (SMC) process for manufacture of composite articles. Sheet molding compound sheet stock is provided comprising non-induction heatable reinforcement material, typically chopped glass fiber or the like, together with induction heatable material in a polymer based resin matrix. The polymer based resin is usually a thermoset resin such as polyester or the like. Alternative non-induction heatable reinforcement materials and resins are commercially available and well known by those skilled in the art. A broad range of induction heatable materials may be incorporated into the SMC sheet stock for induction curing including, for example, chopped metal fibers or "whiskers", continuous metal fiber, powdered metal, graphite or other carbon material, metal ribbon, and even electrically conductive polymer. Typically, the conductive polymer would be included in the form of chopped or continuous fiber.

According to one particularly preferred embodiment of the SMC application of the invention, the induction heatable material is not evenly or homogeneously distributed throughout the SMC sheet stock but, rather, is concentrated in zones or portions of the sheet stock which will form thicker cross-sectional dimension portions of the composite article. Since the longer time needed to cure such thicker cross-sectional portions is often a determining factor in setting the cycle time for production of the composite article, greater concentration of the induction heatable material can be used in these areas to locally increase the rate of heating, resulting in lower cycle times and consequently increased production efficiency. It will be recognized by those skilled in the art in view of this disclosure that a similar approach of managing the distribution of induction heatable material in the sheet molding compound sheet stock can be used in some cases to control the curing of the composite article to reduce unwanted internal stresses in the finished composite article.

The SMC sheet stock comprising induction heatable material as described above is formed, typically, under heat and pressure, between matched metal dies to conform to the shape of the desired composite article. The resulting article is then further heated (in the case of a thermoset resin) to cure the resin at least sufficiently to allow its removal from the mold. It will be understood that the resin may already have begun to cure somewhat during the forming step and that curing the article thus may actually involve simply further curing the resin. In accordance with the invention, the SMC sheet stock is exposed to a time varying magnetic field to cause induction heating of the induction heatable material within the SMC sheet stock. The heat so generated causing heating of the resin of the sheet stock to effect the curing thereof. Of course, as mentioned above, supplementary heating may be provided, for example, by circulating heating fluid through the forming dies in accordance with techniques well known to those skilled in the art. As in the case of the SRIM application of the invention discussed above, the matched die members preferably are formed of ceramic or other materials suitable to pass the magnetic field to the preform during curing and, most preferably, the induction coils are carried in or on the die members such that the SMC preform can be induction cured as it is being formed and/or thereafter while still held between the forming dies.

Another preferred embodiment of the invention comprising an SMC molding process involves placing a metal foil or the like between half thickness sheets of SMC sheet stock to form the full thickness desired for the composite article. While (or after) compression molding the foil and sheet stock sandwich into the shape of the desired composite article, induction heating causes relatively even internal heating to cure the preform.

In one alternative embodiment of the process, a first molding tool is used, formed of metal or other material able to withstand the high pressures associated with the initial molding step. The part then is transferred to a curing mold able to maintain the dimensional stability of the part during the inductive heating step. The curing tool would be subjected to lower forces and would not be metallic.

Figure 2:
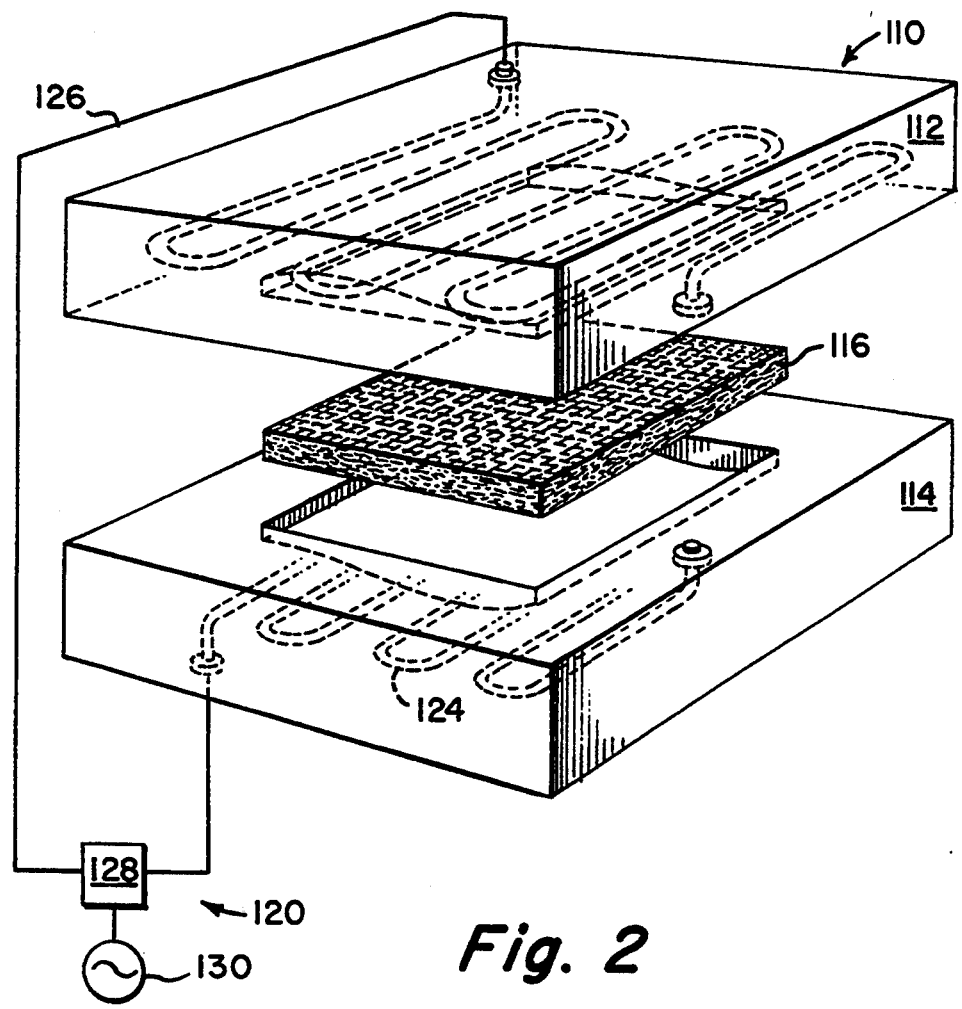
FIG. 2 is a diagrammatic perspective view of another molding tool in accordance with the invention, being adapted for an SRIM molding process comprising induction curing.

Referring now to FIG. 2, a compression molding tool 110 is shown, such as would be suitable for SMC and other compression molding techniques. Molding tool 110 comprises upper mold member 112 and lower mold member 114. SMC sheet stock 116 is positioned between the mold members. Sheet stock 116 comprises non-induction heatable reinforcement materials, such as glass fiber, and induction heatable material, such as metal whiskers, in a thermoset polymer based resin matrix. As in the case of the molding tool of FIG. 1, the molding tool of FIG. 2 incorporates an induction heating system for generating a time varying magnetic field about the molding cavity to accelerate curing of the composite article. The induction curing system 120 comprises a first induction coil 122 embedded in the upper mold member 112. A second induction coil 124 is embedded in the lower mold member 114. As in the case of the molding tool of FIG. 1, mold members 112 and 114 should be constructed of materials which is substantially non-electrically conductive. Ceramic materials are preferred, as discussed above concerning tool 14 of the embodiment illustrated in FIG. 1.

Induction curing system 120 further comprises first electrical connection means 126 for electrically interconnecting the induction coils. Electrical connection means 126 comprises a matching network 128 for matching the impedance of the electric coils and associated leads and connectors to the specific frequency output of RF generator 130. Second electrical connection means 132 electrically interconnects induction coils 122 and 124 when the mold is closed to complete the electrical circuit in the induction curing system. Operation of the RF generator actuates the induction coils to generate a time varying magnetic field across the molding area to heat the induction heatable material of the preform to accelerate curing.

Another preferred embodiment or application of the invention provides a resin transfer molding (RTM) process for making a composite article. Reference to "an RTM preform" usually is understood by those skilled in the art to refer to suitable reinforcement material, typically fibrous reinforcement material, on a surface of an RTM core (often, but not necessarily, having a binder resin associated with the reinforcement material). For an RTM process in accordance with the present invention, induction heatable material, such as metal filaments, also would be provided in the preform, typically on the surface of the preform core. Thus, the RTM preform is provided comprising non-induction heatable reinforcement material and induction heatable material, typically disposed on the surface of a preform core. In accordance with well known techniques the preform core may be made of foam, a gas filled bladder or the like. The non-induction heatable reinforcement material preferably is a non-random filament type, such as woven glass fiber, or can be random fiber mat or the like attached to the surface of the preform core. Alternative preferred reinforcement materials for an RTM preform in accordance with the present invention include synthetic filament reinforcement material, for example Kevlar TM fiber mat reinforcement material (available from Du Pont de Nemours Company) and the like. The induction heatable material for the RTM preform also could be provided as metal fibers interwoven with the non-induction heatable filamentary reinforcement material. Metal ribbon overlaid, underlaid or interwoven with the filamentary reinforcement material also is preferred for certain applications. Some or all of the induction heatable material also may be disposed in the preform core sufficiently proximate its surface to effect efficient heating of the polymer based resin during the curing step.

In certain most preferred embodiments, wherein the induction heatable material consists of metal fiber or ribbons, optionally, interwoven with filamentary reinforcement material on the surface of the preform core, the metal induction heatable material can add significantly to the toughness or handling durability of the preform. In particular, interwoven metal fibers or ribbons can help significantly to keep the reinforcement material in proper position on the surface of the preform core. Consequently, in certain applications, the amount of binder resin with which the reinforcement material typically is impregnated for that purpose can be reduced and fiber washed during the resin injection step after the preform has been positioned within the RTM mold cavity also is reduced. It will be readily apparent to those skilled in RTM manufacturing techniques, in view of the present disclosure, how metal fiber or ribbon incorporated into the preform can be used to help stabilize the filamentary reinforcement material.

After the RTM preform is positioned in the RTM mold cavity and the mold has been closed, resin is injected into the mold cavity in the usual fashion to envelope the preform and impregnate the reinforcement material and the induction heatable material. Induction heating may commence either as the resin is being injected into the mold cavity or, preferably, after the resin is injected and has thoroughly wetted out the reinforcement material of the preform and the mold cavity surface. Induction heating of the preform then proceeds sufficiently to allow removal of the composite article from the mold cavity. As in the other preferred embodiments of the invention discussed above, the RTM mold is formed of a suitable material, preferably non-electrically conductive ceramic. Induction coils preferably are incorporated into the molding dies. Typically, the RTM mold will comprise two main halves (although additional minor die pieces may be used to complete the molding cavity in accordance with known molding tool design techniques) and opposed induction coils preferably are incorporated into such main molding die pieces, much as was shown and discussed above in the SRIM application of the invention.

In another preferred application of the invention, a bulk molding compound (BMC) manufacturing process is provided. The manufacture of composite articles from bulk molding compound is well known to those skilled in the art. In accordance with the present invention, the bulk molding compound comprises, in addition to the usual polymer based resin and reinforcement material, induction heatable material for induction curing of the preform. Suitable induction heatable materials include those described above and will be readily apparent to those skilled in the art in view of this disclosure. Bulk molding compound typically is provided in the form of either putty or a granulated resin mass. The polymer based resins used in bulk molding compounds (and useful also in other embodiments of the present invention) typically are thermosets, for example, polyester resins, epoxy resins, phenolic resins, melamine resins, alkyd resins, vinylester resins, epoxy acrylate resins, nylon resins, silicon resins, diallyl phthalate resins and the like. Molding tools suitable for BMC applications of the invention preferably are formed of ceramic and comprise an induction curing system in accordance with the general principles illustrated above in connection with the invention applications of FIGS. 1 and 2.

Various applications and embodiments of the invention have been described in detail for the purpose of illustration. The invention is not limited by such particular applications and embodiments. The invention is applicable to numerous additional molding techniques for the manufacture of composite articles by induction curing and the following claims are intended to cover the full scope and spirit of the invention.

That which is claimed is:

1. An induction heating method of forming a composite article comprising:
   molding composite material in a mold, the composite material comprising non-induction heatable reinforcement material and induction heatable material in a thermally curable polymer based resin;
   curing the polymer based resin at least partially while in the mold by exposure to a time varying magnetic field; and
   removing the composite article from the mold.

2. The induction heating method of forming a composite article according to claim 1 wherein the induction heatable material is electrically conductive material selected from the group consisting of metal, conductive polymer, carbon and any combination thereof.

3. The induction heating method of forming a composite article according to claim 2 wherein the induction heatable material is in a form selected from the group consisting of continuous filaments, chopped filaments, flakes, coated spheres, powder and any combination thereof.

4. The induction heating method of forming a composite article according to claim 1 wherein the induction heatable material is selected from the group consisting of woven metal fibers, random metal fiber mat, metal mesh and any combination thereof.

5. The induction heating method of forming a composite article according to claim 1 wherein said induction heatable material is formed of metal selected from the group consisting of steel, copper, aluminum, silver, nickel, lead, gold, tin, and any combination thereof.

6. The induction heating method of forming a composite article according to claim 1 wherein the induction heatable material and the non-induction heatable reinforcement material together comprise interwoven metal and glass fibers.

7. The induction heating method of forming a composite article according to claim 1 wherein the non-induction heatable reinforcement material is in a form selected from the group consisting of continuous filaments, chopped filaments, particulate material and any combination thereof.

8. The induction heating method of forming a composite article according to claim 7 wherein the non-induction heatable reinforcement material is selected from the group consisting of glass fibers, synthetic fibers and any combination thereof.

9. The induction heating method of forming a composite article according to claim 1 wherein the polymer based resin is a thermoset resin.

10. The induction heating method of forming a composite article according to claim 1 wherein the polymer based resin is cured entirely by induction heating.

11. The induction heating method of forming a composite article according to claim 1 wherein the polymer based resin is cured in a mold by induction heating in combination with thermal heating from the mold.

12. The induction heating method of forming a composite article according to claim 1 wherein the step of molding composite material comprises compression molding SMC in a matched die mold, the non-induction heatable reinforcement material comprising random chopped fibers in the SMC and the induction heatable material comprising random chopped metal fibers in the SMC.

13. The induction heating method of forming a composite article according to claim 12 wherein the composite article is of non-uniform wall thickness, the random chopped metal fibers being concentrated in the thicker wall sections.

14. The induction heating method of forming a composite article according to claim 1 wherein the step of molding composite material comprises loading an RTM preform in a cavity of an RTM mold, closing the RTM mold, and introducing the polymer resin as a thermally curable fluid resin into the RTM mold cavity, the RTM preform comprising the non-induction heatable reinforcement material and the induction heatable material on a surface of a preform core.

15. The induction heating method of forming a composite article according to claim 14 wherein curing the resin further comprises heating via thermal conduction of heat energy to the preform from the RTM mold.

16. The induction heating method of forming a composite article according to claim 14 wherein the induction heatable material comprises metal fibers substantially uniformly distributed with the non-induction heatable reinforcement material on the surface of the preform core.

17. The induction heating method of forming a composite article according to claim 14 wherein the induction heatable material comprises wire mesh in overlapping relation with the non-induction heatable reinforcement material on the surface of the preform core.

18. The induction heating method of forming a composite article according to claim 14 wherein the curing step comprises actuating induction coils embedded within the RTM mold while the preform is within the RTM mold cavity.

19. The induction heating method of forming a composite article according to claim 14 wherein the RTM mold is formed of substantially non-electrically conductive ceramic material.

20. The induction heating method of forming a composite article according to claim 1 comprising a bulk molding process wherein the step of molding the composite material comprises introducing a blend of the polymer based resin, non-induction heatable reinforcement material and induction heatable material into a cavity of a mold and thereafter closing the mold to shape the blend into the composite article.

21. The induction heating method of forming a composite article according to claim 1 wherein the induction heatable material and the non-induction heatable reinforcement material are distributed in a substantially solid matrix of the polymer based resin.

22. An induction heating method of forming a composite article comprising
constructing a preform of the article comprising non-induction heatable reinforcement material and induction heatable material distributed together in a polymer based resin; and
curing the preform at least partially by induction heating the induction heatable material by exposing the preform to a time varying magnetic field.

23. The induction heating method of forming a composite article according to claim 22 wherein the step of constructing the preform comprises coating at least a portion of the polymer based resin onto the induction heatable material and the non-induction heatable reinforcement material together to form resin impregnated reinforcement material, and thereafter conforming such resin impregnated reinforcement material to a shape approximating that of the composite article.

24. The induction heating method of forming a composite article according to claim 22 wherein the preform is exposed to a time varying magnetic field by actuating induction heating coils embedded in the mold.

25. An induction heating method of forming a composite article comprising:
positioning thermoformable sheet molding compound comprising chopped glass fibers and metal whiskers in a polymer based resin into a mold, the metal whiskers being concentrated in selected portions of the sheet molding compound;
curing the polymer based resin at least in part by heat conducted from the metal whiskers, the metal whiskers being induction heated by exposing the sheet molding compound to a time varying magnetic field while compression forming the sheet molding compound to form it into the composite article within the mold, the composite article having thicker wall portions and thinner wall portions, the thicker wall portions containing the selected portions of the molding compound; and
removing the article from the mold.

26. The induction heating method of forming a composite article according to claim 2 wherein said induction heatable material comprises particulate materials.

27. The induction heating method of forming a composite article according to claim 1 wherein said induction heatable material is formed of an alloy wherein the base metal is selected from the group consisting of copper, aluminum, silver, nickel, lead, gold, iron or tin.

* * * * *